United States Patent [19]

Schroeder

[11] Patent Number: 4,725,712
[45] Date of Patent: Feb. 16, 1988

[54] ELECTRICAL DEVICE FOR VAPORIZING VOLATILES

[75] Inventor: Peter Schroeder, Viersen, Fed. Rep. of Germany

[73] Assignee: Henkel Kommanditgesellschaft auf Aktien, Duesseldorf, Fed. Rep. of Germany

[21] Appl. No.: 847,795

[22] Filed: Apr. 3, 1986

[30] Foreign Application Priority Data

Apr. 13, 1985 [DE] Fed. Rep. of Germany ....... 3513307

[51] Int. Cl.⁴ .............................................. A61L 9/03
[52] U.S. Cl. .................................. 219/276; 219/272; 219/275; 422/306
[58] Field of Search ............... 219/271, 272, 275, 276; 422/306; 239/57, 136; 43/129

[56] References Cited

U.S. PATENT DOCUMENTS 3,748,438  7/1973  Costello .............................. 219/276
3,923,458  12/1975  Moran ................................ 219/276
4,214,146  7/1980  Schimanski ......................... 219/274
4,391,781  5/1983  van Lit ............................... 219/274
4,571,485  2/1986  Spector .............................. 219/276

FOREIGN PATENT DOCUMENTS 2832249  1/1980  Fed. Rep. of Germany ...... 219/274
2003034  3/1979  United Kingdom .

Primary Examiner—A. D. Pellinen
Assistant Examiner—Jeffrey A. Gaffin
Attorney, Agent, or Firm—Ernest G. Szoke; Henry E. Millson, Jr.; Mark A. Greenfield

[57] ABSTRACT

An electrical device for vaporizing vaporizable material from a solid carrier comprising a feed passage whose rear wall is a heating plate and an L-shaped chimney extending through the feed passage, so that air is drawn in from the lower end of the chimney and passes out the upper end of the chimney after heating, together with vaporized material.

26 Claims, 6 Drawing Figures

ELECTRICAL DEVICE FOR VAPORIZING VOLATILES

BACKGROUND OF THE INVENTION

1. Field of the Invention

This invention relates to an electrical device for vaporizing volatile substances such as insecticide from solid carriers comprising a vertically disposed electrical heating plate in a housing and a tablet feed passage extending substantially horizontally past the heating surface of the heating plate with a tablet insertion slot in the side of the housing and further comprising contact pins for insertion into a power socket or the like on the back of the housing.

2. Statement of the Related Art

An electrical vaporizer of this type is described in U.S. Pat. No. 4,214,146 and corresponding published German patent application No. 27 30 855. In the associated oblate ellipsoid shaped housing, a disc shaped heating element and an insecticide tablet are arranged vertically one on top of the other. The tablet is disposed immediately behind a grating which is permeable to the vaporized insecticide and which forms part of the front of the housing, extending substantially vertically in use. The tablet is brought into the operational position through a slot in the side of the housing through a horizontal feed passage. The feed passage may extend transversely through the housing. The insecticide is vaporized almost exclusively by diffusion through the open grating in the front of the housing; ventilation slots provided in the back of the housing are virtually inaccessible to the vapors coming from the tablet. One disadvantage of this known vaporizer is that the vaporized substance cannot normally be dispersed in the surrounding atmosphere by convection, but only by molecular movements, because of the concentration gradient maintained by the vaporization. The condensation of the vaporized substance from the corresponding outlet openings is particularly troublesome. Furthermore, a fan may have to be used for dispersing or rather circulating the vaporized substance.

Another vaporizer for an insecticide, designed to be plugged into an electrical wall socket, is described in published British patent application No. 2,003,034 and corresponding published German patent application No. 28 25 674. The associated housing comprises a lower chamber with air inlet openings and an upper chamber with air outlet openings. Arranged at the boundary between the lower and upper chambers are an electrical heater and, vertically thereover on a grid of pins or teeth, a tablet of insecticide. The tablet, the grid supporting it and the heating element are designed and arranged in such a way that, in addition to its actual function (i.e. vaporization of the insecticide), the heating element is able by convection to generate an air stream flowing vertically through the air inlet openings into the housing, around the insecticide tablet in the housing and then back out of the housing through the air outlet openings. In this vaporizer, the resistance heater by which the insecticide tablet is vaporized has to be heated far beyond the temperature necessary for vaporizing the insecticide, because there is no direct contact between the tablet and the heating element. accordingly, a large proportion of the heating energy is lost without being used and high heating temperatures are necessary to evaporate from the particular tablet substances that are difficult to vaporize. Another disadvantage of the known vaporizer is the on/off indicator lamp because it deflects the convective air flow and hence interferes with permeation of the insecticide.

BRIEF DESCRIPTION OF THE INVENTION

The present invention provides an electrical device for vaporizing volatile substances from solid carriers or vaporizable solid substances themselves in which a convection gas stream is concentrated in the region of the tablet to be vaporized and in which the condensation of volatiles at the vaporizer outlet is avoided despite a relatively low heating and vaporizer temperature. In addition, the device according to the invention is so designed that solid tablets, wafers, or the like may be introduced or replaced from the side without difficulty and without any risk of injury by contact with live and/or heated elements. The inventive electrical device comprises a vertically disposed heating plate and a tablet feed passage extending horizontally past its vertical heating surface. The invention is particularly distinguished in that the heating surface is preceded by an air duct in the form of a chimney, which may be closed apart from an air intake slot in the front of the housing and a vapor outlet slot at the top. An air duct between the air intake slot and the lower edge of the heating plate bypasses a function indicator lamp and, before meeting the lower edge of the heating plate, curves from the horizontal into the vertical. The vapor outlet slot is situated vertically above the tablet, which is optionally pressed flat against the heating surface of the heating plate.

According to the invention, flowing air is guided in the manner of chimney air past the solid carrier, which is heated to its vaporization temperature, so that the air entrains the vaporized product. The air duct in the housing begins, initially substantialy horizontally, at an intake slot provided in the front of the housing, which may be above a function indicator lamp. Accordingly, functional interference emanating from the lamp is unlikely. Inside the housing, the duct is curved into the vertical beneath the edge of the heating plate. This ensures that the particular tablet introduced and the heating plate (or rather its heating surface) are disposed vertically in the convective aire stream, and that a temperature gradient is established between the air taken in and the exit air. The design ensures that the temperature increases toward the vapor outlet slot, thus guaranteeing that the volatile substance actually vaporizes upwards and that the formation of condensate at the outlet opening is very largely avoided, despite the relatively low temperature of the housing.

The device according to the invention comprises a tablet feed passage which extends horizontally past the heating plate parallel to the heating surface in such a way that the air duct and the solid carrier feed passage cross in front of the heating surface. By virtue of the intense heating in the region of the heating surface and the chimney effect of that part of the air duct above the heating plate, air may be taken in not only through the intake slot in the front of the housing, but also through the tablet insertion and removal slots in the sides of the housing. Accordingly, the volume of air which is taken in through three slots having a given overall cross-section is then exhausted through the much smaller cross-section of the vapor outlet slot. The air charged with the vaporized product is thus highly accelerated en route from the heating plate to the vapor outlet slot, in accordance with standard flow continuity equations. Some variations in the physical configuration of this device are illustrated in copending U.S. design patent application Ser. No. 745,755, which is incorporated herein by reference.

DESCRIPTION OF THE DRAWINGS

One embodiment of the invention is described in detail in the following with reference to the accompanying drawings, wherein.

DETAILED DESCRIPTION OF THE INVENTION

Figure 1A:
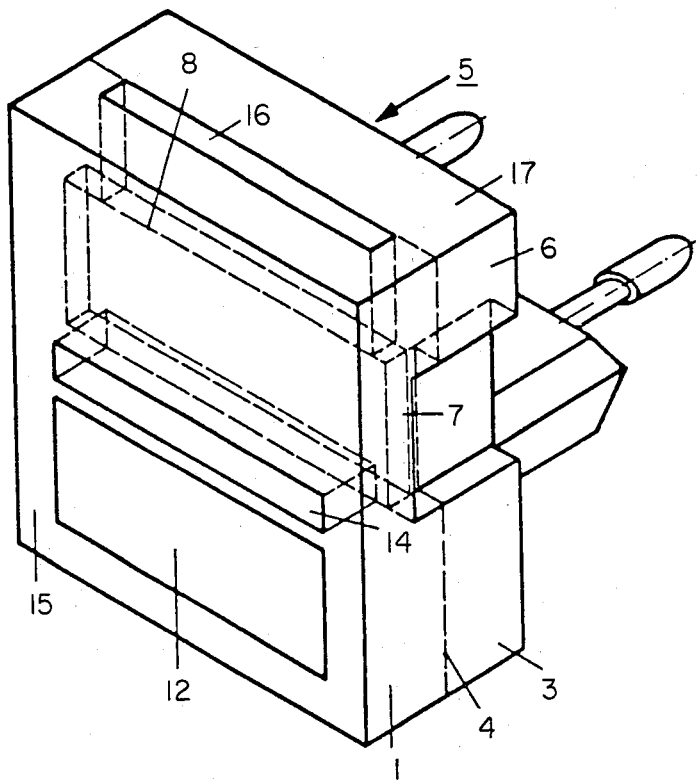
FIGS. 1a, 1b and 1c are different perspective views of a vaporizer.
Figure 1B:
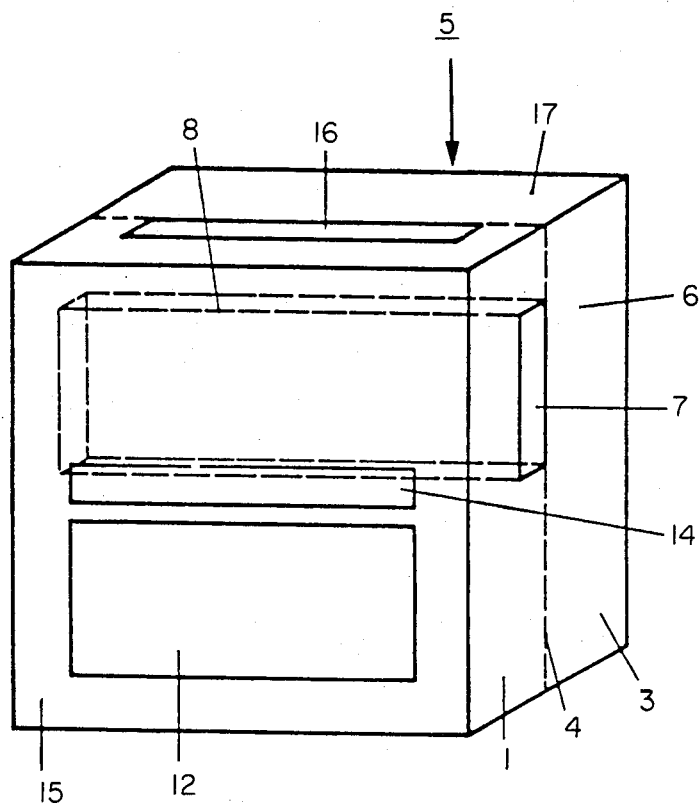
Figure 1C:
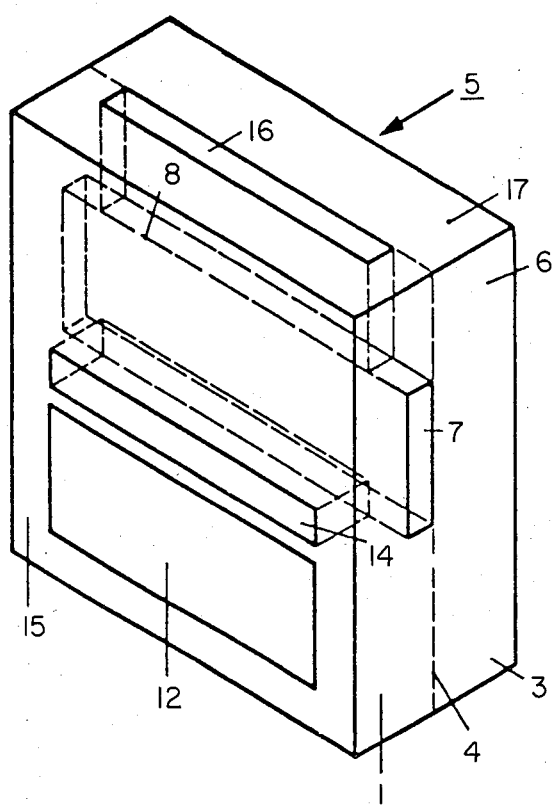
Figure 2:
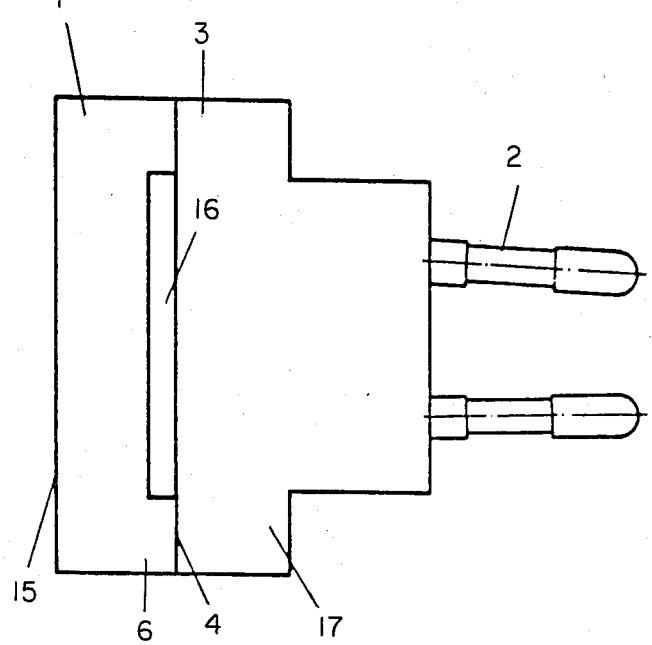
FIG. 2 is a top planar view of the vaporizer shown in FIG. 1b.
Figure 3:
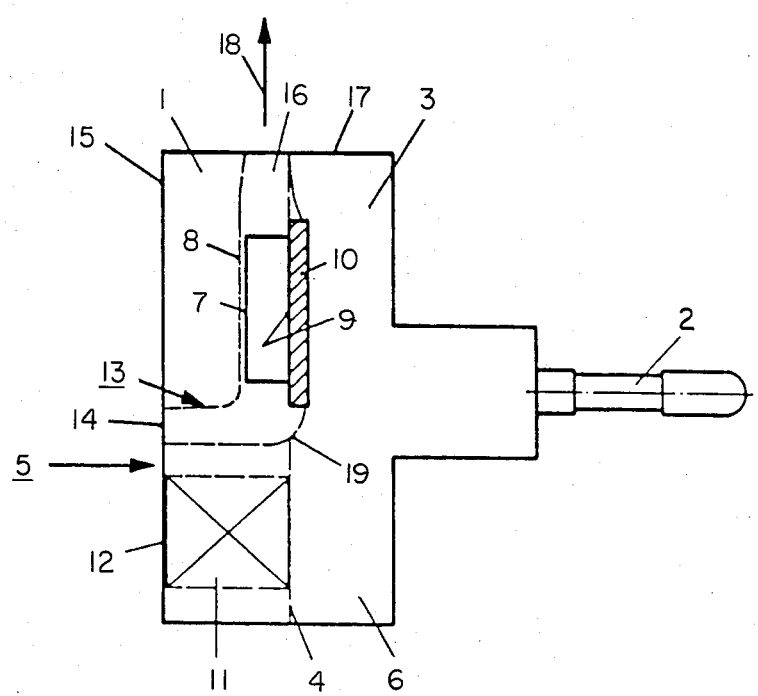
FIG. 3 is a side elevation of the vaporizer shown in FIG. 1b.
Figure 4:
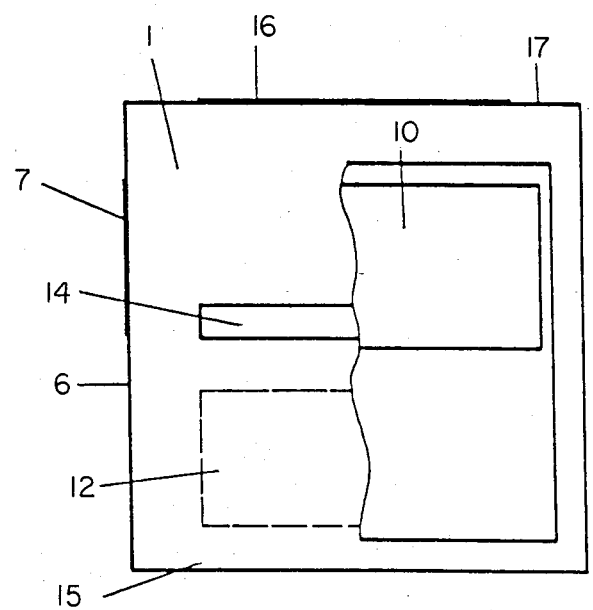
FIG. 4 is a front partial elevation of the vaporizer shown in FIG. 1b.

The electrical device for the vaporization of solid carriers, preferably insecticide tablets which is shown in FIGS. 1 to 4 comprises a housing with a front cap 1 and a rear cap 3 provided with contact pins 2 for insertion into a power socket. The front cap 1 and the rear cap 3 are joined along the dashed line 4. In each side 6, the housing (which is globally denoted by the reference 5) has a tablet insertion slot 7 for the insertion and removal of the tablets. The mutually opposite tablet insertion slots 7 are joined to one another by a tablet feed passage 8. Means may be provided for closing slots 7, to prevent air intake from any place other than intake slot 14. Such means are not illustrated, and may be removable stoppers, integral flaps or valves, or the like. The tablet feed passage 8 extends directly past the heating surface 9 of a heating plate 10 arranged vertically inside the housing. The heating plate 10 is a resistance heating means and is supplied with electricity through the contact pins 2. In operation, a tablet introduced into the feed passage 8 rests flat against the heating surface 9. Optionally, the tablet may be baised against the heating surface 9 by any suitable biasing means (not shown) such as a leaf spring or an inward constriction of the passage wall opposite the heating plate. A glow lamp 11, or the like, with a fluorescent screen 12 optionally indicating the function of the device, is provided beneath the heating plate in the housing 5. The glow lamp 11 is also supplied with electricity through the contact pins 2. Any other suitable electrical indicator, such as a meter, may also be used.

According to the invention, a tablet inserted into the tablet feed passage 8 and at least the heating surface 9 of the heating plate 10 is positioned in an air duct globally denoted by the reference 13 which acts as a chimney. The air duct has an air intake slot 14 in the front 15 of the housing and an air and vapor outlet slot 16 in the top 17 of the housing above the position of the tablet and the heating plate 10. In the region of the heating surface 9, the air duct 13 is shaped in such a way that there is sufficient space for an tablet to be inserted into the tablet feed passage 8. Just above the space where the tablet is to be placed, the air duct 13 is heavily tapered, for example to a few mm. In the region of the heating surface 9, the air duct 13 may be relatively wide so that sufficient quantities of air are able to flow past the inserted tablet towards the vapor outlet slot 16. Under the effect of the first relatively wide and then heavily tapered cross-section of the air duct, a strong air convection current with a chimney effect is generated above the tablet, blowing the vaporized product at relatively high velocity out of the outlet slot 16 in the direction of the arrow 18.

On its intake side, the air duct 13 has a bend 19 beneath the heating plate 10 to enable air to be taken in from the front 15 of the vaporizer and, in this way, to keep a function indicator lamp, for example the glow lamp 11, remote from the convection current.

This invention is preferably used as an insecticide or insect repellant dispensor. However, it is also useful for the vaporization of perfumes such as incense, air fresheners, and the like. The composition to be vaporized need only have a suitable carrier, which can be any solid which is volatized to a gaseous state by the heat generated from the heating plate. It is also possible for the carrier to be immune to the heat, and to release impregnated volatile substances upon heating, without degredation. In such instance, an exhausted carrier, such as a tablet, is forced out by insertion of a fresh tablet.

The contact pins (2) may be adapted to plug directly into a standard a.c. receptacle, with or without a builtin electrical transformer, or to plug into or connect with any other source of electrical energy such as a battery, automobile cigarette lighter socket, or the like.

The housing may comprise any suitable heat-resistant material, such as metal (with suitable insulation), a bakelite or other thermosetting resin, or the like.

I claim:

1. An electrical device for vaporizing vaporizable material from a solid carrier comprising:
   a housing;
   an electrical heating plate vertically disposed within said housing;
   electrical connector means extending rearward of said housing, electrically operatively connected to said heating plate, adapted for connection to an electrical power source;
   a solid carrier feed passage, extending substantially horizontally through said housing from side to side, one vertical wall of which is formed by said heating plate, adapted for insertion and discharge of a solid carrier in either horizontal direction; and
   a chimney passing through said housing, comprising a generally L-shaped duct having an air intake in the front of said housing at a level below said feed passage, a passageway from said air intake extending substantially horizontally back into said housing to a point below said solid carrier feed passage, and then extending substantially vertically upward through and coincident with said feed passage, ending in an air and vapor outlet through the top of said housing.

2. The device of claim 1 further comprising an electrically operated function indicator mounted at a visible surface of said housing and electrically operatively connected to said electrical connector means.

3. The device of claim 2 wherein said heating plate comprises the rear vertical wall of said feed passage and a portion of said chimney.

4. The device of claim 3 wherein the vertical portion of said chimney which extends from above said feed passage to said outlet is constrictingly tapered.

5. The device of claim 1 wherein said feed passage biases said solid carrier against a heating plate.

6. The device of claim 3 wherein said feed passage biases said solid carrier against a heating plate.

7. The device of claim 2 wherein the vertical portion of said chimney which extends from above said feed passage to said outlet is constrictingly tapered.

8. The device of claim 1 wherein said heating plate comprises the rear vertical wall of said feed passage and a portion of said chimney.

9. The device of claim 8 wherein the vertical portion of said chimney which extends from above said feed passage to said outlet is constrictingly tapered.

10. The device of claim 1 wherein the vertical portion of said chimney which extends from above said feed passage to said outlet is constrictingly tapered.

11. The device of claim 1 wherein said chimney interior surface is curved at the bend of said L-shape.

12. The device of claim 11 wherein said air intake is a rectangle that is wider than it is high and said air and vapor outlet is a rectangle that is wider than it is deep.

13. The device of claim 1 wherein said air intake is a rectangle that is wider than it is high and said air and vapor outlet is a rectangle that is wider than it is deep.

14. The device of claim 1 wherein said feed passage biases said solid carrier against a heating plate.

15. The device of claim 1 wherein means are provided for substantially closing both ends of said feed passage when a solid carrier is inserted therein.

16. The device of claim 1 wherein both ends of said feed passage are open and comprise additional air intakes for said chimney.

17. The device of claim 1 wherein said electrical connector means comprises a contact pin adapted to be inserted in the cigarette lighter socket of an automobile.

18. The device of claim 1 wherein said electrical connector means comprises two contact pins adapted to be inserted in an electrical receptacle.

19. The device of claim 1 wherein said electrical connector means comprises two contact leads adapted to be connected to an electrical battery.

20. The device of claim 1 wherein said feed passage has identical substantially rectangular openings which are taller than wide and of substantially the same height as said heating plate.

21. The device of claim 1 wherein biasing means are provided within said feed passage at a point opposite said heating plate, for biasing a solid carrier against said heating plate.

22. The device of claim 1 with a solid carrier in the form of a tablet impregnated with a vaporizable substance in a shape adapted to be inserted into said feed passage until it contacts said heating plate and readily removeable therefrom.

23. The device of claim 22 wherein said vaporizable substance comprises an insecticide.

24. The device combination of claim 22 wherein said vaporizable substance comprises an insect repellant.

25. The device of claim 22 wherein said vaporizable substance comprises a perfume.

26. An electrical device for vaporizing vaporizable material from a solid carrier comprising:
a housing of generally regular parallelepiped form;
an electrical heating plate vertically disposed within said housing;
electrical connector means extending rearward of said housing, electrically operatively connected to said heating plate, adapted for connection to an electrical power source;
a solid carrier feed passage extending substantially horizontally through said housing from side to side, the rear wall of which is formed by said heating plate, having identical substantially rectangular openings which are taller than wide and of substantially the same height as said heating plate, which feed passage is adapted for insertion and discharge of a solid carrier in either horizontal direction;
a chimney passing through said housing, comprising a generally L-shaped duct having an air intake in the front of said housing at a level below said feed passage, a passageway from said air intake extending substantially horizontally back into said housing to a point below said feed passage, and then extending substantially vertically upward through and coincident with said feed passage, ending in an air and vapor outlet through the top of said housing, the chimney surface being curved at the bend of said L-shape, the vertical portion of said chimney extending from said feed passage to said outlet being constrictingly tapered, and said air intake being a rectangle that is wider than it is high and said air and vapor outlet being a rectangle that is wider than it is deep; and
an electrically operated function indicator mounted at the front surface of said housing below said air intake and electrically operatively connnected to said electrical connector means.

* * * * *